Sept. 21, 1954     R. HOURRUITINER     2,689,604
SAFETY BELT FOR AUTOMOBILES
Filed April 10, 1953

INVENTOR.
Ramon Hourruitiner
BY
McMorrow, Berman + Davidson
ATTORNEYS

Patented Sept. 21, 1954

2,689,604

UNITED STATES PATENT OFFICE 2,689,604

SAFETY BELT FOR AUTOMOBILES

Ramon Hourruitiner, Astoria, N. Y.

Application April 10, 1953, Serial No. 347,969

1 Claim. (Cl. 155—189)

This invention relates to safety belts, and more particularly has reference to a belt of this type having improved means facilitating connection of the same to the back rest of a vehicle seat, and to a person supported on said seat.

One important object of the present invention is to provide a safety belt of the character referred to which will be so designed, so far as a back-rest-engaging portion is concerned, as to permit the safety device to be connected to the back rest with speed and facility, and without marring or damaging the back rest in any way.

Another object of importance is to provide a safety belt of the type stated which will be of an adjustable nature, so far as said back-rest-engaging portion is concerned, thus to permit the belt to be readily connected to seats of different widths.

Another object of importance is to provide a safety belt as described which will have a body strap so designed as to extend about the waist of a supported person, said body strap being particularly adapted to hold the person against the seat in the event of collision, with the body strap being further designed to offer minimum interference to the ordinary movements of a person.

Yet another object of importance is to provide a safety belt as stated which will be inexpensively constructed, can be attached to or removed from a seat with considerable facility, and will not require modification or redesign of said seat in any way.

Other objects will appear from the following description, the claim appended thereto, and from the annexed drawing, in which like reference characters designate like parts throughout the several views, and wherein:

Figure 1:
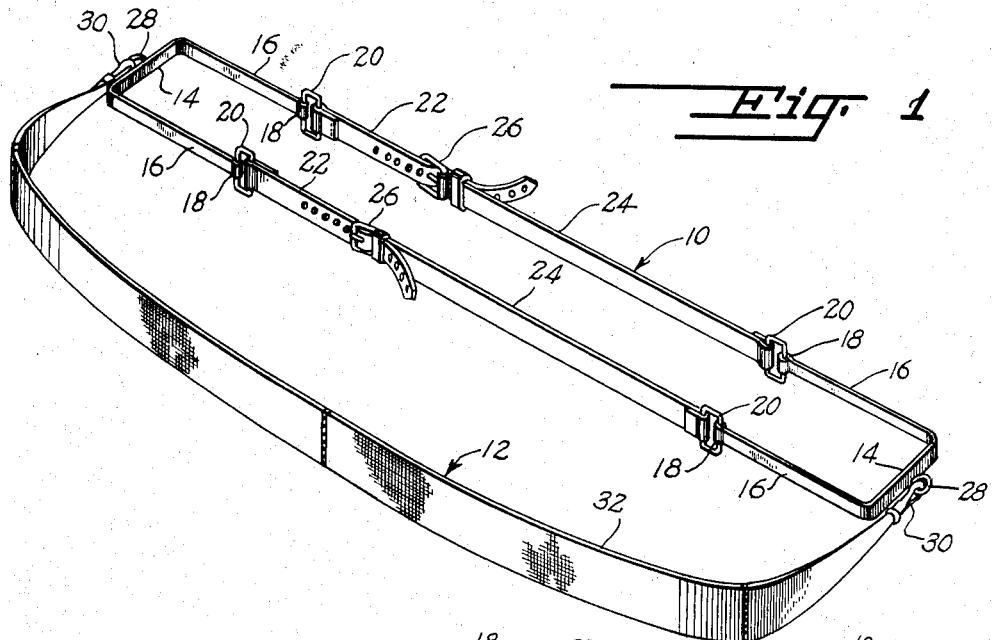
Figure 1 is a perspective view of a safety belt formed in accordance with the present invention.

The reference numeral 10 has been applied generally in the drawing to designate a seat-engaging portion of the safety device constituting the present invention, the reference numeral 12 being similarly applied to the body-engaging portion of the device.

Referring first to the portion 10, it will be observed from Figure 1 that at opposite ends, said portion is provided with U-shaped yokes or brackets each of which includes a bight 14 merging at its opposite ends into parallel legs 16. Each yoke engages an end of a vehicle seat, the legs overlying the front and back surfaces of the seat, and the bight extending across the end surface of the seat. The yokes are preferably made of flat bar material or the like, but I believe that in commercial embodiments of the invention other materials, including materials having substantially greater flexibility than flat bar metal stock, might well be used.

In any event, at the free ends of the legs 16 there are formed sleeves 18, the sleeves 18 being vertically disposed and being engaged with connecting rings 20.

To the rings 20 of one yoke there are connected strap members 22, and to the rings 20 of the other yoke there are connected strap members 24 having buckles 26 connectible to the members 22.

By reason of the construction illustrated and described, it will be seen that the portion 10 is adapted to extend about the back rest of a vehicle seat, without in any way requiring modification or redesign of said back rest, or connection of any elements directly to the back rest. Instead, the portion 10 comprises an endless member, in its final analysis, which member can be varied as to length, according to the width of the seat with which it is to be engaged.

Fixedly attached to each bight 14, medially between the opposite ends thereof, are outwardly extended eyes 28, and releasably engaged with said eyes are clasps 30 provided upon the opposite ends of a body strap 32. Clasps 30 and body strap 32 constitute the body-engaging portion 12 of the device, and it will be understood that ordinarily the body strap would have a certain amount of elasticity, thus to permit the body strap to be resiliently expanded to a certain extent in the event of a sudden collision tending to force the person against the body strap in a direction away from the back rest of the vehicle seat. The substantial width of the body strap, in this connection, distributes the pressure of the strap against the body of the user over a substantial area, thus to prevent the strap from cutting into the body. Preferably, a strap of approximately eight inches width is used. At its opposite ends, the strap tapers as best shown in Figure 1, to the point of its connection to its associated clasps 30.

Figure 2:
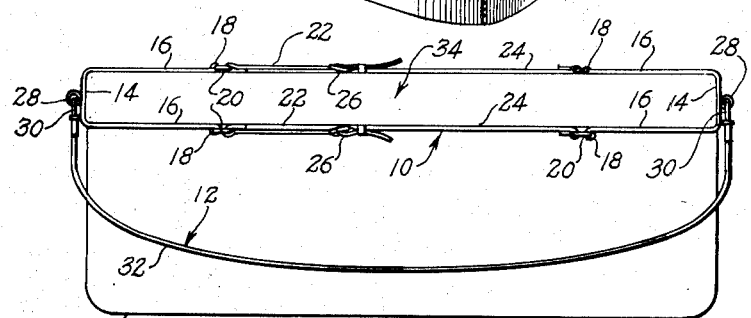
Figure 2 is a top plan view of the belt, the belt being illustrated in operative relationship to a vehicle seat.
Figure 3:
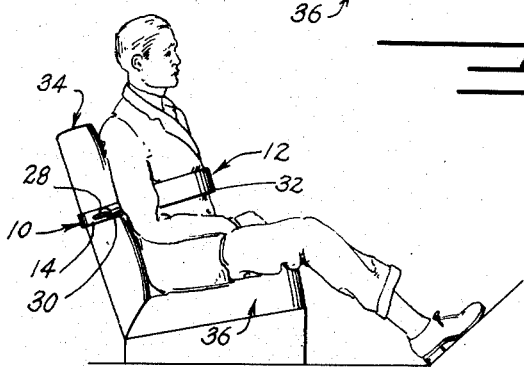
Figure 3 is a side elevational view of the seat and associated safety belt, the safety belt being extended about the waist of the user.

A vehicle seat has been illustrated in Figures 2 and 3, and includes a back rest designated generally at 34 and a seat portion designated generally at 36. It will be noted that the backrest-engaging portion 10 of the device can be left connected to the seat, and at such time as it is desired to use a safety belt, the clasps 30 can be attached to the rings 28.

Further, when the device is not in use, the portion 10 can be removed entirely from the back rest if desired, or can be slipped downwardly to the base of the back rest.

In any event, when the device is to be used, the strap 32 will extend about the waist or torso of the user, and will afford substantial protection in the event of a sudden stop or collision. In such instances, a person is often thrown forward, and seriously injured. However, when the safety device constituting the present invention is used, the body strap 32, while yielding resiliently to a certain extent, will prevent the passenger from being thrown forward to such an extent as would serious injury.

It is believed apparent that the invention is not necessarily confined to the specific use or uses thereof, described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A safety belt for automobiles comprising a pair of rigidly constituted, U-shaped yokes facing one another, each yoke being formed with a straight bight adapted to extend across a side surface of an automobile seat back, and with straight, elongated legs extending from the bight at right angles thereto and adapted to overlie the front and rear surfaces, respectively, of said seat back; flexible front and rear straps adapted for adjustment as to their lengths, each strap being connected at its ends to, and extending between, corresponding legs of the yokes so as to hold the yokes in embracing relationship to the sides of said seat back; eyes projecting outwardly from the respective bights; a flexible body strap member substantially greater in length than the distance between said bights and extending in front of said yokes and straps from one to the other of the yoke bights, thereby to hold a vehicle passenger against excessive movement away from the seat back; and clasp elements on the ends of the body strap member releasably engaging said eyes to hold the body strap member assembled with the yokes.

References Cited in the file of this patent

UNITED STATES PATENTS

| Number | Name | Date |
|---|---|---|
| 548,076 | Mack | Oct. 15, 1895 |
| 944,020 | DeCamp | Dec. 21, 1909 |
| 1,721,516 | Jacobs | July 23, 1929 |
| 2,413,395 | Ware | Dec. 31, 1946 |

FOREIGN PATENTS

| Number | Country | Date |
|---|---|---|
| 515,818 | Great Britain | Dec. 14, 1939 |